(No Model.)

B. G. LAMME.
ALTERNATING CURRENT GENERATOR.

No. 564,703. Patented July 28, 1896.

WITNESSES:
Hubert C. Tener
William T. Weible

INVENTOR
Benjamin G. Lamme
BY
Terry and MacKaye
ATTORNEYS.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

ALTERNATING-CURRENT GENERATOR.

SPECIFICATION forming part of Letters Patent No. 564,703, dated July 28, 1896.

Application filed June 30, 1894. Serial No. 516,152. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Alternating-Current Generators, (Case No. 603,) of which the following is a specification.

My invention has relation to alternating-current generators, and particularly to such as are intended to produce two or more phases of current.

The object of my invention is to provide a form of multipolar alternator having a closed-coil winding on an armature which shall be available for the production of two or more phases of current.

My invention is illustrated in the accompanying drawings, wherein—

Figure 1:
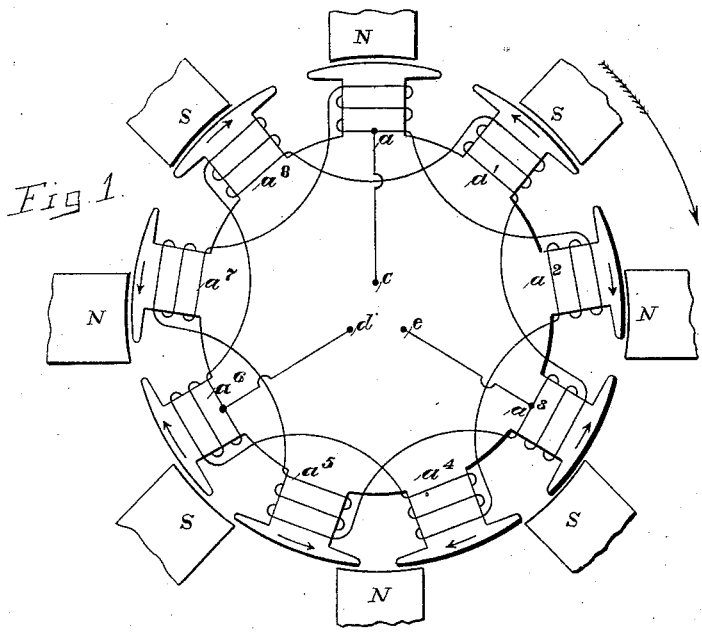
Figure 2:
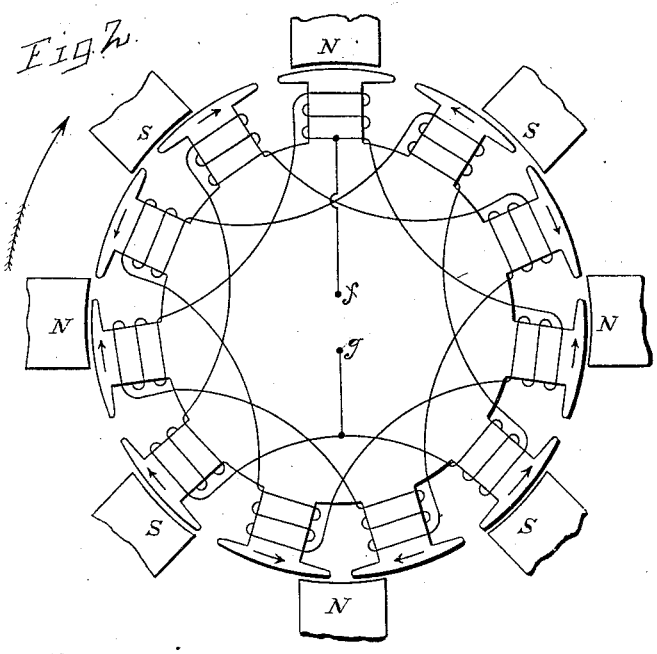

Figure 1 shows my invention applied to an alternator having an eight-pole field and a nine-pole armature, and Fig. 2 shows the invention applied to an alternator having an eight-pole field-magnet and an eleven-pole armature.

Of course my invention is applicable to alternators having any desired or convenient number of poles in either the field-magnet or armature considered by itself; and it may also be said that in general practice, and for the sake of convenience, the armature is to be made ordinarily with one more pole than are present in the field-magnet.

In alternate-current generators as hitherto made the armature and field-magnet have the same number of poles, and the coils on the armature are all in series and are of the open-coil type, it being possible to take off only a single phase of current, inasmuch as since every armature-pole occupies the same position with regard to the field-magnet poles at any given time the electromotive forces generated in the various coils of the armature are all of the same phase at once.

In an application dated April 30, 1894, and serially numbered 509,502, I have described and claimed a form of closed-coil multipolar alternator wherein several phases are produced by providing either two more or two less coils in the armature than in the field. I do not claim this form specifically herein, but present broad claims covering a more general law hereinafter set forth.

I have discovered that in an alternator wherein the armature has a number of poles which is one more or less than any multiple of the number of pairs of poles on the field-magnet it is only necessary to wind the coils always in the same direction around the armature-poles, and according to a law hereinafter more fully stated. If such a coil be connected so as to form one single closed circuit, any desired number of phases of current can be taken off therefrom.

In the drawings the field-magnet poles are marked alternately, and the direction of rotation of the armature is indicated by the feathered arrow outside of the figures. The resulting direction of electromotive forces set up in each coil of the armature are indicated by means of the small arrows.

It will be seen that all the armature-coils are wound in the same direction, and are not alternately reversed, as is the case with ordinary alternators. If, now, in the form shown in Fig. 1 the armature-wire is wound in the same direction, but on every other pole counting around the armature, it will be seen from the drawings that a continuous closed-coil winding will be formed, the potential tendencies at the several poles being indicated by the small arrows. At the instant when the armature is in the position indicated in Fig. 1 the armature-pole marked $a$ is in such position that no electromotive force is being generated in its coil, since it is neither approaching nor leaving the pole N. Considering the next pole $a'$ to the right, we see that it is approaching the south pole S. This will produce an electromotive force in the direction of the small unfeathered arrow. Following the winding past the next pole $a^2$, which it skips, and considering the next pole $a^3$, upon which the wire is wound, we find the same condition of approaching a south pole. The same is true of each of the coils $a^5$ and $a^7$. All the coils thus followed are therefore tending to send current in the direction opposite to that of the rotation of the armature. On continuing to follow the winding we see that after the pole marked $a$ is passed the poles $a^2$, $a^4$, $a^6$, and $a^8$, previously skipped, now become the active agents to be considered, and each of them is found to be approaching a north pole N. Consequently they must each be tending to send current in the same direction that the armature is rotating. As the potential tendencies of coils $a'$ and $a^8$ are opposed to each other in the position of the armature shown, these coils will be doing no effective work and at this instant the current, due to the electromotive forces of the remaining coils, will be conducted from the machine by the leads $d$ and $e$. It will thus be seen, without a detailed enumeration of the potential tendencies in the several armature-coils for the different positions, which they assume with reference to the field-magnet poles and the relation of the same to the three leads $c$, $d$, and $e$, that three currents will be generated and led from the machine, which are displaced in phase with reference to each other, by reason of the different positions of the coils with reference to the character and strength of the portions of the magnetic field, through which they are moving at all times.

While I have shown the leads $c$, $d$, and $e$ connected to the middle of the coils upon certain of the armature-poles, I desire it to be understood that the connections may be made to the connecting-loops or bridging conductors, if desired, provided a symmetrical arrangement is maintained.

Among the advantages in this form of machine is the production of alternating currents of any desired number of phases, according to the number of points symmetrically situated at which such currents are tapped off of the armature. This is a well-known property of the Gramme ring, but it is one which has not been hitherto produced in a multipolar armature.

The form of armature shown in Fig. 1 is peculiarly convenient for the production of three phases of current for three-phase distribution systems, as indicated above.

In Fig. 2 is shown a form of multipolar generator wherein the eight-pole field-magnet is made to excite an eleven-pole armature.

Upon inspection of the small arrows indicating, as in Fig. 1, the directions of potential tendencies in the various coils of the armature, it will be seen that the desired closed-coil arrangement may be obtained in this form by winding the wire always in the same direction and skipping two poles all the way around the armature, as in Fig. 1, but that in the eleven-pole form the points where the currents divide will be found at opposite sides, as at $f$ and $g$. In this form, however, the currents come together at $f$, or the point of no induction, while they flow apart at $g$.

Supposing any number of field-magnet poles, and supposing the winding to be always in the same direction around the armature-poles; supposing also that the number of armature-poles, whether odd or even, is one more or less than a multiple of the number of pairs of field-magnet poles; the number of times that it will be necessary to go entirely around the armature in order to complete the closed coil will be found by the following law: Divide the number of armature-poles by one-half the number of field-magnet poles, and the nearest integer to the quotient will be the number of times that it will be necessary to go around the armature in order to close the coil. Of course the number of poles skipped in making the winding will be one less than this. Applying this law to the two specific cases in hand, we have in Fig. 1 nine (the number of armature-poles) divided by four (one-half the number of field-magnet poles) gives a quotient of one and three-quarters. The nearest integer is two, and therefore we have to skip one pole and go twice around the armature to close the coil. In Fig. 2 eleven divided by four gives two and three-quarters, and the nearest integer is three. Therefore we skip two armature-poles and go three times around the armature. The rule will be found to apply to all cases. Thus a five-pole armature in an eight-pole field will give the required closed-coil winding by skipping no poles, but simply winding each pole of the armature successively and in the same direction once around the armature.

My invention is not concerned with peculiar details of construction, as, for instance, the shapes of poles and the mode of building, but consists in the discovery and application of a principle whereby currents may be obtained from a closed-coil multipolar armature having coils wound in the same direction on all the poles.

What I claim is—

1. A multipolar polyphase generator having an armature provided with a number of radial poles which is one more or less than a multiple of the number of pairs of poles in the field-magnet, a closed coil on said armature and leads connected to said coil at equidistant points, substantially as described.

2. In a multipolar generator having a radial-pole armature, a closed winding making a complete circuit around the armature a number of times equal to the integer nearest to the quotient obtained by dividing the number of armature-poles by one-half the number of field-magnet poles, and leads connected at equidistant points to said winding, substantially as described.

3. The combination with a multipolar field-magnet, of a closed coil, radial-pole armature and multiphase-circuit leads connected to the armature-winding at points symmetrically situated around said armature, substantially as described.

4. In a multiphase generator, a closed-coil radial-pole armature having all the poles wound in the same direction, the leads for the multiphase circuits being connected to said winding at equidistant points, substantially as described.

5. In an alternating-current generator a closed-coil radial-pole armature having all its poles wound in the same direction, the wire being wound so as to skip alternate poles, substantially as described.

6. In a multipolar multiphase generator, an armature having a number of radial poles differing from the number of field-magnet poles by one, substantially as described.

7. In a multipolar multiphase generator, a radial-pole armature having one more pole than the field-magnet of the generator, substantially as described.

8. In a multipolar alternating-current generator, a radial-pole armature having all its poles wound in the same direction, said winding making two complete circuits of the armature and being closed upon itself, substantially as described.

In testimony whereof I have hereunto subscribed my name this 27th day of June, A. D. 1894.

BENJ. G. LAMME.

Witnesses:
JAS. W. SMITH,
HAROLD S. MACKAYE.